United States Patent

Lew et al.

[11] 4,322,056
[45] Mar. 30, 1982

[54] POSITIVE CLOSURE DISC VALVE

[76] Inventors: Hyok S. Lew, 7890 Oak St., Arvada, Colo. 80005; Ronald R. Chapman, 9425 N. Calle el Milagro, Tucson, Ariz. 85704

[21] Appl. No.: 236,206

[22] Filed: Feb. 20, 1981

[51] Int. Cl.$^3$ ............................................. F16K 1/22
[52] U.S. Cl. ................................. 251/88; 251/163; 251/192; 251/306
[58] Field of Search ................. 251/84, 88, 160, 163, 251/192, 304, 305, 306

[56] References Cited

U.S. PATENT DOCUMENTS

| 3,126,193 | 3/1964 | Atherton | 251/306 |
| 3,378,227 | 4/1968 | Newell | 251/304 |
| 3,601,364 | 8/1971 | Scaramucci | 251/306 |
| 3,627,259 | 12/1971 | Williams | 251/163 |
| 3,727,879 | 4/1973 | Lange et al. | 251/84 |
| 3,779,511 | 12/1973 | Wenglar | 251/306 |

FOREIGN PATENT DOCUMENTS

| 221683 | 11/1957 | Australia | 251/306 |
| 671017 | 9/1963 | Canada | 251/305 |
| 520873 | 10/1953 | Italy | 251/306 |

Primary Examiner—H. Jay Spiegel

[57] ABSTRACT

This invention relates to a valve wherein the valve disc is actively pressured onto the valve seat for a positive closure by means of a compressive force exerted on the stem which is linked to the center of the valve disc at a slanted angle. A tensile force applied to the stem disengages the valve disc from the valve seat that facilitates the opening and closing action of the valve.

2 Claims, 5 Drawing Figures

POSITIVE CLOSURE DISC VALVE

There are much demand in the industry for a valve that closes one hundred percent without relying on the cushioning effect of the valve seat made of soft material, because such a soft material often deteriorates at a moderately high temperature. The constant pressure consistantly existing between the valve disc and valve seat promotes the scraping action during the opening and closing motion of the valve, which scraping action is a major cause of the valve failure. This invention relates to a disc valve that eliminates two problems mentioned above which are common with the conventional disc valves such as the butterfly valves.

The primary object of the present invention is to provide a disc valve wherein the seating pressure existing between the valve disc and the valve seat is externally relieved for the opening and closing action, while said pressure is externally imposed after closing action for the positive closure.

Another object of the present invention is to provide a valve which provides the positive closure even with a valve seat made of hard material withstanding a very high temperature.

A further object of the present invention is to provide a valve wherein the wear of the valve seat caused by the scraping action by the valve disc is eliminated.

These and other objects of the present invention will become clear as the description of the present invention proceeds. The present invention may be described with a greater clarity and specificity by referring to FIGS. 1, 2, 3, 4 and 5.

Figure 1:
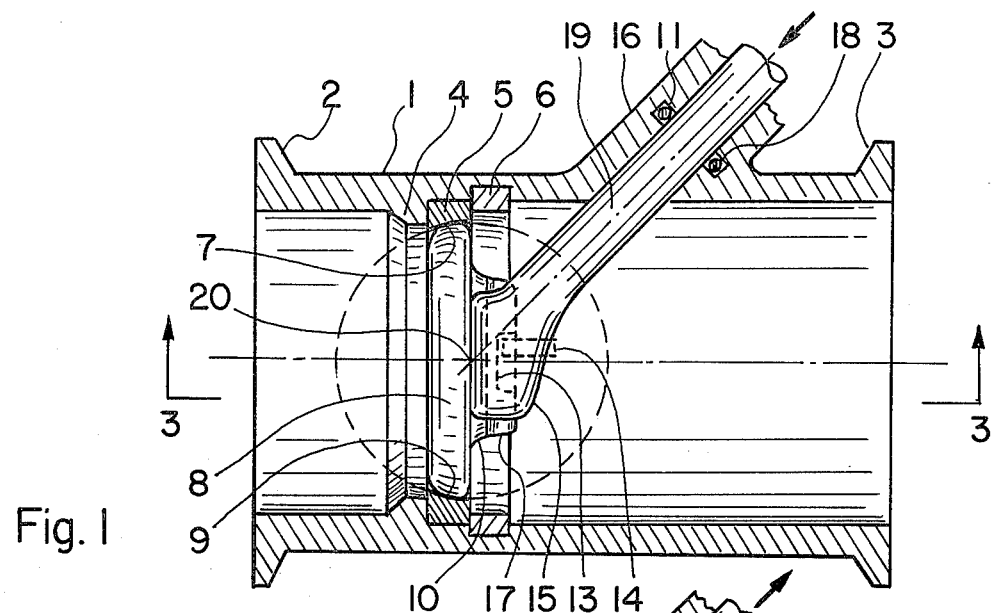
FIG. 1 illustrates a cross section of a positive closure disc valve, which cross section is taken along a plane disecting the valve into two symmetrical halves, wherein the valve disc is pressed to the valve seat by the compressive force exerted to the valve stem.
Figure 3:
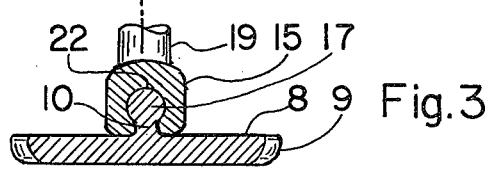
FIG. 3 illustrates the detail of the connection of the valve stem to the valve disc.

In FIG. 1, there is shown a cross section of a positive closure disc valve constructed in accordance with the principles taught by the present invention, which cross section is taken along a plane passing through the longitudinal center line of the valve. The positive closure disc valve illustrated in the present embodiment comprises a hollow cylindrical body 1 with both ends including means 2 and 3 for connecting to the pipes or tubing. A shoulder 4 is disposed on the inner surface of the hollow cylindrical body 1 to provide a support for the valve seat 5 which is retained in the groove by the retaining ring 6. The valve disc 8 has a tapered circumferential face 9 in contact with the seating surface 7 of the valve seat, both of which seating surfaces under pressure contact confirms with the spherical surface with the center 20 at which point the center line of the valve stem 19 and the center line of the valve body 1 intersect one another. Here it is implied by the surfaces 7 and 9 conforming with the spherical surface with the center 20 a surface that is an annular segment of said spherical surface or any other straight or tapered annular surface generally tangential to said spherical surface. The stem 19 is disposed in a slanted angle relative to the center line of the valve body 1 and connected to the valve disc 8 at the lower extremity. The stem 19 extends to the exterior of the valve through the slanted stem-housing 16 including a groove 11 containing a seal 18. It is generally preferable to employ the 45 degree slant angle for the stem-housing 16 and the stem 19 though any other angle of sizable magnitude is acceptable. The valve disc 8 is connected to the lower extremity of the stem 19 by a rib 10 built on the valve disc 8, of which enlarged ridge 17 slidably engages the matching groove formed on the lower extremity 15 of the stem 19 wherein a pin 14 affixed to the lower extremity 15 of the stem engages a slot 13 formed on the enlarged ridge 17 of the rib 10. A further detail of the connection of the valve disc 8 to the lower extremity 15 of the stem 19 is shown in FIG. 3 illustrating a cross section of said connection taken along a plane 3—3 as shown in FIG. 1, wherein the only possible movement of the valve disc 8 relative to the stem 19 is the sliding movement along a plane including the center line of the stem 19 in a direction perpendicular to the center line of the valve body 1, while any pivoting motion of the valve disc 8 relative to the stem is not allowed, which is accomplished by the groove 22 engaged by the rib 10 with the enlarged ridge 17 formed on the valve disc 8.

Figure 2:
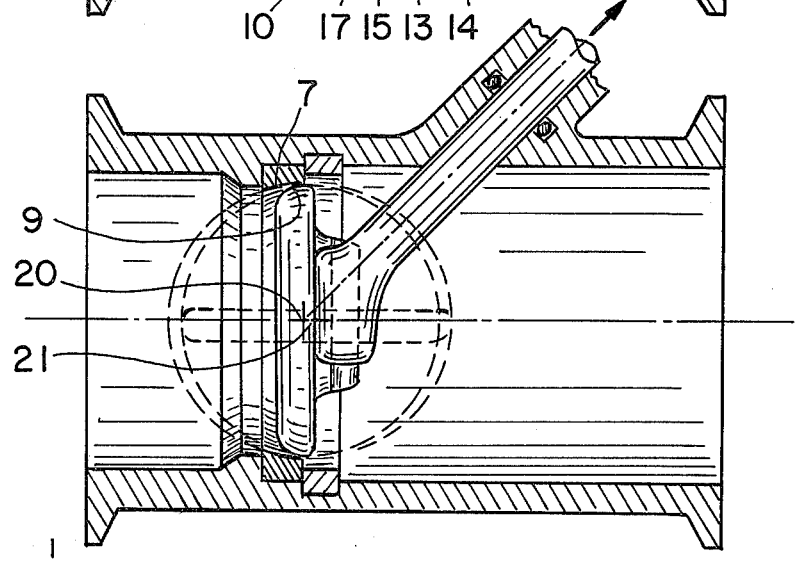
FIG. 2 illustrates the same cross section as shown in FIG. 1 with the valve disc disengaged from the valve seat by the tensile force exerted to the valve stem.

There is shown in FIG. 2 the same cross section of the valve of the present invention as that shown in FIG. 1. Now, the stem 19 is pulled out over a small distance which action disengages the circumferential surface 9 of the valve disc 8 from the tight contact with the seat surface 7. This action of disengagement is clearly illustrated by the new location of the pivoting center of the valve disc 21 retreated from the old position 20, which retreatment is caused by the slight pulling out action of the stem 19 combined with the sliding motion of the rib 10 of the valve disc 8 relative to the lower extremity 15 of the stem 19. Since the pressure between the valve disc 8 and the seat 5 is now removed, the valve disc 8 can be easily rotated from the closed position to the open position and vice versa. The valve disc 8 located at the fully open position as shown by the valve disc outlined in the broken lines results from the 180 degree turn of the stem 19 from the fully closed position. After closing the valve disc by turning the stem back 180 degree, the stem 19 is slightly pushed in to establish the tight contact between the valve disc 8 and the seat 5 in order to achieve the positive closure, which is accomplished as the pivoting center for the valve disc moves back to the position 20 from the position 21.

Figure 4:
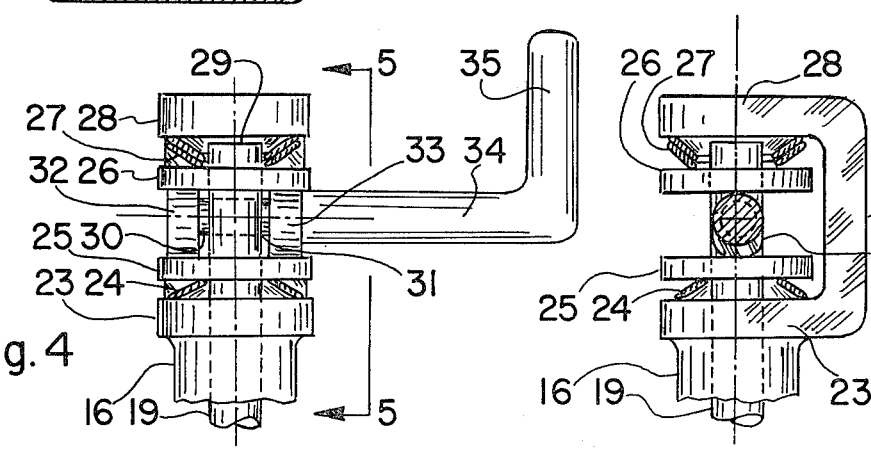
FIG. 4 illustrates an elevation view of the arrangement of the valve stem including means for exerting the compressive or tensile force on the valve stem.
Figure 5:
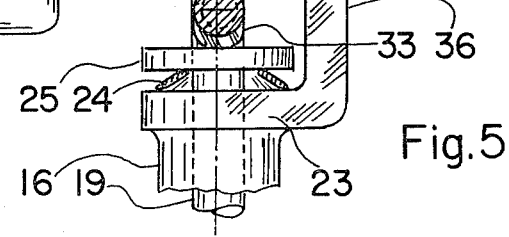
FIG. 5 illustrates a cross section view taken along a plane 5—5 as shown in FIG. 4.

In FIG. 4 there is shown an embodiment of the mechanical arrangement of the means for slightly pulling out and slightly pushing in the valve stem 19, which mechanical means is further illustrated by FIG. 5 showing a cross section taken along a plane 5—5 as shown in FIG. 4. Referring to FIG. 4, the upper extremity of the stem-housing 16 comprises a flanges 23 and 28 rigidly connected to one another by a web 36. A washer 25 is disposed on top of a belleville spring 24 resting on the flange 23 and another washer 26 is disposed on the bottom of a belleville spring 27 resting on the flange 28. A pair of eccentric rollers 32 and 33 rigidly disposed on the each end of a journal 30 rotatably engaging the hole 31 through the upper extremity of the stem 19, are sandwiched between the flanges 23 and 28. The journal 30 extends to the handle 34 that terminates with an angled end 35. The eccentric rollers 32 and 33 may be designed in such a way that a stop means is included to provide a stable stops for the rollers rotated to two extreme positions corresponding to fully pushed in and pulled out stems, respectively, which positions are obtained by rotating the angled end of the handle 34 about the center line of the handle 34. Of course the opening and closing of the valve is done by rotating the handle 34 over 180 degrees about the center line of the stem 19. The top end 29 of the stem 19 may be designed to provide a stop means at any open position when the stem 19 is in slightly pulled out position, whereby the valve can be used as a throttling valve as well as a shut off valve. The use of one or both of the belleville springs shown in FIGS. 4 and 5 provides a resiliency to the pulling out and pushing in action of the valve stem 19 resulting from the action of the eccentric rollers 32 and 33. It is obvious that the handle arrangement shown in FIGS. 4 and 5 functions also without all or part of the belleville springs when the pair of flanges 23 and 28 are redisposed to the positions where the pair of the washers are located, respectively. It is quite obvious that many different arrangements of the means for pushing in and pulling out the stem over a small distance are available to suit particular requirements and circumstances.

While the principles of the invention have now been made clear in an illustrative embodiment there will be immediately obvious to those skilled in the art many modifications of structure, arrangements, proportions, the elements, materials and components used in the practice of the invention which are particularly adapted for specific environments and operating requirements without departing from these principles.

I claim:

1. A positive closure disc valve comprising in combination:
   (a) a valve body with a stem-housing disposed in a slanted angle relative to said valve body;
   (b) a valve seat with a tapered seating surface;
   (c) a valve disc with a tapered seating surface corresponding to said tapered seating surface of said valve seat;
   (d) a stem disposed in a slanted angle to said valve disc and engaging and extending through said stem-housing, the lower extremity of said stem connected to said valve disc in a sliding relationship wherein the only movement allowed to said valve disc relative to said stem is the sliding movement in a direction substantially parallel to the center line of said stem as well as the central axis of said valve body in the direction substantially perpendicular to the central axis of said valve body, rotation of said stem in one direction moving said valve disc to an open position substantially parallel to said valve body center line and rotation of said stem in another opposite direction moving said disc to a closed position substantially perpendicular to said valve body center line: and
   (e) a handle including means for slightly pulling out and slightly pushing in said stem whereby said stem at the slightly pushed in position presses said valve disc to said valve seat providing the positive closure, while said stem in slightly pulled out position removes the pressure contact between said valve disc and said valve seat for easy opening and closing of said valve disc.

2. A positive closure disc valve comprising in combination:
   (a) a valve body with a stem-housing disposed in a slanted angle relative to said valve body;
   (b) a valve seat with a tapered seating surface;
   (c) a valve disc with a tapered seating surface corresponding to said tapered seating surface of said valve seat;
   (d) a stem disposed in a slanted angle to said valve disc and engaging and extending through said stem-housing, the lower extremity of said stem connected to said valve disc in a sliding relationship wherein the only movement allowed to said valve disc relative to said stem is the sliding movement in a direction substantially parallel to a plane including the center line of said stem as well as the central axis of said valve body in the direction substantially perpendicular to the central axis of said valve body, rotation of said stem in one direction moving said valve disc to an open position substantially parallel to said valve body central axis and rotation of said stem in another opposite direction moving said disc to a closed position substantially perpendicular to said valve body central axis; and
   (e) a means for rotating said stem including means for slightly pulling out and slightly pushing in said stem whereby said stem at the slightly pushed in position presses said valve disc to said valve seat providing the positive closure, while said stem in slightly pulled out position removes the pressure contact between said valve disc and said valve seat for easy opening and closing of said valve disc.

* * * * *